United States Patent [19]

Pietruszewski

[11] 4,140,495
[45] Feb. 20, 1979

[54] TURNDOWN CONTROL FOR PRESSURE SWING ADSORPTION

[75] Inventor: John J. Pietruszewski, Buffalo, N.Y.

[73] Assignee: Union Carbide Corporation, New York, N.Y.

[21] Appl. No.: 801,361

[22] Filed: May 27, 1977

[51] Int. Cl.² .......................................... B01D 53/04
[52] U.S. Cl. ...................................... 55/21; 55/25; 55/58; 55/62; 55/75
[58] Field of Search .................. 55/18, 21, 25, 26, 62, 55/160, 161, 162, 163, 179, 387, 389

[56] References Cited

U.S. PATENT DOCUMENTS

| | | | |
|---|---|---|---|
| 3,230,688 | 1/1966 | Kitchen et al. | 55/21 X |
| 3,257,772 | 6/1966 | Maddox et al. | 55/21 X |
| 3,540,188 | 11/1970 | Barrere, Jr. et al. | 55/62 X |
| 3,636,679 | 1/1972 | Batta | 55/26 |
| 3,703,068 | 11/1972 | Wagner | 55/21 |
| 3,738,087 | 6/1973 | McCombs | 55/62X |
| 3,775,946 | 12/1973 | Brazzel | 55/62 X |
| 3,922,149 | 11/1975 | Ruder et al. | 55/25 X |

Primary Examiner—Robert H. Spitzer
Attorney, Agent, or Firm—John C. Lefever

[57] ABSTRACT

During periods of reduced product withdrawal rate the variable adsorption pressure type of pressure swing adsorption system is controlled by monitoring a product gas flow characteristic and advancing the cycle from its cocurrent depressurization step so as to maintain the product gas withdrawal quantity as a direct and predetermined function of the reduced withdrawal rate.

6 Claims, 7 Drawing Figures

TURNDOWN CONTROL FOR PRESSURE SWING ADSORPTION

BACKGROUND OF THE INVENTION

This invention relates to a method of and appartus for controlling a gas separation adsorption system during periods of reduced product withdrawl rate, i.e. "turndown".

Adiabatic pressure swing systems are used for separating feed gas mixtures by selective adsorption of at least one component in at least two adsorption beds and withdrawing one component-depleted product gas therefrom. While one adsorption bed is receiving feed gas at least one other bed is being depressurized, purged of the one component adsorbate and at least partially repressurized in preparation for return to the feed gas mixture treatment step. To provide a continuous supply of product gas the adsorbent beds are commonly arranged in parallel flow relationship and operated in a repetitive cycle.

Adiabatic pressure swing adsorption systems may by further classified in terms of variable adsorption pressure and constant adsorption pressure. In the latter the pressure in the adsorbent bed processing feed gas is substantially constant during the entire feed gas step, and this type of system is commonly used where the product consuming means requires product gas at constant and relatively high pressure. In the variable adsorption pressure system the feed gas mixture is introduced at progressively higher pressure to the inlet end of the adsorbent bed and depending on the product withdrawl rate, the bed pressure varies and most commonly increases during at least the first part of the adsorption step. The variable pressure adsorption system is best suited where the product consuming means do not require product gas at constant pressure and can accept relatively low pressure gas. This invention relates to only the variable pressure type of adiabatic pressure swing adsorption system wherein feed gas mixture is introduced at progressively higher pressure to the inlet end of the adsorbent bed thereby progressively increasing the pressure thereon, and one component-depleted gas is discharged from the opposite or discharge end at variable pressure with at least part thereof withdrawn from the system as product gas.

In some product consuming means, the product gas withdrawl rate periodically and uncontrollably varies on demand over multiple cycles from a maximum rate to reduced rate substantially below the maximum rate. One such pressure swing adsorption system — product consuming means is an air separation adsorption system from which oxygen product gas is withdrawn and supplied as the aeration gas for a wastewater treatment system. The wastewater feed rate (and hence the oxygen demand rate) may vary greatly depending on seasonable or diurnal conditions.

The variable adsorption pressure system for such varying product demand rates must be designed to supply the maximum rate, since it is not usual practice to store product gas on-site. Nevertheless, the system must be capable of supplying product gas at reduced rates substantially below the maximum rate in a relatively efficient manner. By way of example, the percent recovery of product gas from the feed gas mixture at reduced product demand rate should not be greatly below the recovery at maximum or design rate. Moreover, the product gas purity at reduced product demand rate should be at least the specified average product purity. As used herein, "specified average product purity" means the average purity of product gas withdrawn from the pressure swing adsorption system per cycle at maximum product gas withdrawl rate.

Certain embodiments of the variable adsorption pressure type of adiabatic pressure swing adsorption system are described in Batta U.S. Pat. No. 3,636,679 and McCombs U.S. Pat. No. 3,738,087, both incorporated herein to the extent pertinent. Fir purposes of the invention this type of system may be broadly described in process terms as an adiabatic pressure swing process for gas separation by selectively adsorbing at least one gas component in at least two adsorbent beds and withdrawing one component-depleted product gas therefrom at specified average product purity and variable pressure in a repetitive cycle by introducing feed gas at progressively higher pressure to the inlet end of a first adsorbent bed thereby progressively increasing the pressure therein and discharging one component-depleted product gas from the discharge end with a one component mass transfer front being initially established at the inlet end and moving toward the discharge end during cycle steps including cocurrently depressurizing the first bed and terminating such cocurrent depressurization when the first bed is at lower pressure. One part of the first bed gas is withdrawn during the cocurrent de-pressurization as product gas and another part also withdrawn during the cocurrent depressuriation is returned for partial repressurization of another previously purged adsorbent bed. Waste gas is released fron the cucurrently depressurized first bed inlet end thereby countercurrently depressurizing same to a lowest pressure. One component-depleted gas from another adsorbent bed discharge end is introduced to the depresuized first bed discharge end as purge gas for desorption of the one component adsorbate and the one component-containing purge gas is discharged from the first bed inlet end. Then one-component depleted gas fron an other-than-first bed discharge end is introduced at above the lowest pressure to the purged first bed for partial repressurization thereof orior to reintroducing progressively higher pressure feed gas to the first bed inlet end.

Unless adjustments are made when the product gas withdrawl rate fron such a system drops substantially below the maximum rate, the purge and repressurization requirements of adsorption beds not delivering one-component depleted gas are satisfied before the cocurrently depressurizing bed has reached the lower pressure at which the cycle would normally be advanced to the next step. If, however, the cycle is advanced at this point of time the gas rejected during the countercurrent depressurization step will contain one component-depleted gas which would be delivered as product gas at maximum withdrawl rate. The quantity of product gas withdrawn per cycle from adiabatic pressure swing systems operating on a completely timed cycle is directly proportional to the rate of product withdrawl from the system, i.e. the quantity of product gas withdrawn per cycle is halved when the product withdrawl rate is halved so that the percent recovery is reduced by one half.

Such inefficient use of the system product capacity is in part avoided by practicing a control method described in the aforementioned Batta U.S. Pat. No. 3,636,679. The cycle is advanced when the gas pressure of the cocurrently depressurizing bed delivering product gas has experienced a pressure reduction commensurate with the delivery of its fully rated quantity of product gas. By way of illustration and referring to FIG. 4, the cocurrent depressurization step of bed A is terminated when the bed pressure declines to 16 psigs and beds B and C have previously been isolated between the points at which they complete their repressurization and purge steps respectively and point at which the bed A cocurrent depressurization terminal pressure is reached. In this manner the feed gas compressor may be "unloaded" or taken out of sevice when bed B reaches 40 psig and loaded again when all three beds are advanced fron step 4 to step 5. This represents a feed gas compression power saving and reciprocating-type compresors are well suited for such intermittent unloading-loading type of service.

Those skilled in the adsorption art recognize that the length of a selectively adsorbed one component mass transfer zone in selective adsorption systems is a direct function of the gas flow rate through the bed. This relationship is for example described in the book "Mass Transfer Operation" by Robert E. Treybal, McGraw-Hill Company, New York, 1955, page 490. As used herein the length of the mass transfer zone refers to the longitudinal portion of the adsorbent bed in the direction of feed gas flow, between the leading and trailing edges of the moving mass transfer front as described more completely in Kiyonaga U.S. Pat. No. 3,176,444.

Based on the aforedescribed state-of-art, one would logically expect that when a variable adsorption pressure type pressure swing adsorption system is "turned down" and controlled in the Batta manner, the one component mass transfer zone (which was contained in the bed at maximum product flow rate) will also be fully contained at the reduced flow rate.

Contrary to these expectations it has been discovered that when the Batta cocurrent depressurization pressure control method is practiced during turndown, the product recovery is substantially adversely affected and the product purity undesirable increases. By way of example, in a three bed adiabatic pressure swing adsorption system receiving air as feed gas and discharging 70% oxygen as the product gas, the oxygen recovery declines fron 100% to 80% when the oxygen production rate is turned down by 36%. At the same time the purity of the oxygen product gas increases to about 87%. It will be readily apparent that the system is operating substantially less efficiently under turndown conditions.

An object of the invention is to provide an improved control method of and apparatus for adiabatic pressure swing adsorption systems of the increasing adsorption pressure type during periods of reduced product withdrawl rate.

A more specific object of the invention is to provide a control system which permits reduction of the product withdrawl rate without simultaneously reducing the product recovery to the extent experienced by the prior art.

Other objects and advantages of this invention will be apparent from the ensuing disclosure and appended claims.

SUMMARY

This invention relates to a method of and apparatus for control of adiabatic pressure swing adsorption systems of the variable adsorption pressure type during periods of reduced product withdrawl rate.

The method aspect of the invention relates to the variable adsorption pressure type of prior art adiabatic pressure swing adsorption system as previously broadly described. In particular the method includes monitoring at least one product gas flow characteristic from the group consisting of withdrawal quantity and rate, during at least a portion of the one-component-depleted gas discharge from each adsorption bed cycle. That is, the monitored product gas flow characteristic may be either the product gas withdrawal quantity from the system or the product gas withdrawal rate from the system, or both product withdrawl quantity and rate. The monitoring can be during only a portion of the one component-depleted gas discharge from each adsorbent bed cycle, or during the entire discharge. Since one component-depleted gas is being discharged during the entire cycle, this means that monitoring may, but need not, be continued during the entire cycle. It should also be understood that as used herein, one component-depleted gas refers to the gas discharged from the discharge end of a bed. As previously explained, this gas is discharged during periods when the bed pesssure is increasing (repressurizing), pressure equalizing with another bed initially at lower pressure, or cocurrently depressurizing. Also as previously explained, part of this gas may be returned to another adsorbent bed(s) to perform the functions of purging or repressurizing. Another part of this discharged one component-depleted gas is withdrawn from the system as product.

In addition to the monitoring of at least one product gas characteristic during at least a portion of the one component-depleted gas discharge from each adsorbent bed cycle and on occasion of the reduced rate of product gas withdrawal demand, the cycle of each adsorbent bed is advanced from its cocurrent depressurization step to the immediately following step and the cycles of all other adsorbent beds are simultaneously advanced. This advancing is controlled so as to maintain the product gas withdrawal quantity as a direct and predetermined function of the reduced rate of product gas withdrawal demand, with the cocurrent depressurization step advancing such that the fractional reduction in product gas discharge quantity per adsorbent bed per cycle is greater than 5% of the fractional reduction in product gas withdrawal rate from the maximum rate. If the turndown rate is such that the reduction in product discharge quantity is less than 5%, the adverse effect on efficiency (reduced product recovery and increased product purity) is inadequate to justify use of this invention.

In contrast to the prior art pressure control system, in this invention the terminal or lowest pressure of the cocurrent depressurization step at turndown is below the corresponding terminal pressure at the product gas maximum withdrawal rate.

In this invention the cycle advancing is also controlled such that movement of the one component mass transfer front is limited so that the one component-depleted product gas discharged from the adsorbent bed last receiving repressurization gas from the first adsorbent bed during its cocurrent depressurization step delivers product gas of at least the specified average product purity.

This control method permits the practitioner to turn down a pressure swing adsorption system of the variable adsorption pressure type in a manner such that the maximum quantity of product gas is withdrawn per adsorbent bed cycle at the minimum acceptable product purity. In the time delay embodiment of this control method, the one component-depleted gas discharge period from each bed is divided into two parts, the first part being of fixed time duration and the second part yielding a fixed quantity of product gas which comprises a portion of the one component-depleted gas discharged from the bed(s) during the second part. Accordingly in the time delay embodiment the withdrawal quantity is the product gas flow characteristic which is monitored. In another embodiment of this control method the product gas flow rate is measured and the product withdrawal quantity totalized therefrom as for example by an analog computer. The impulse generated by this totalized quantity is used to signal cycle advance.

As will be discussed hereinafter in detail, the instant method has been demonstrated in full size systems in the sense of improved product recovery as compared with prior art turndown control methods. By way of example and referring to the previously described three bed air separation system discharging 90% oxygen at maximum rate, the oxygen recovery is improved from 83% to 87% at 60% turndown.

The apparatus aspect of this invention is of the general type requiring at least two adsorbent beds arranged and joined for alternate flow of feed gas mixture to the inlet end of each adsorbent bed and withdrawal of one component depleted product gas in a repetitive cycle. Cycle control means are provided for introducing feed gas mixture at progressively higher pressure to the inlet end of a first adsorbent bed thereby progressively increasing the bed pressure, and discharging one component-depleted gas from the discharge end, reducing the pressure at the first bed discharge end thereby cocurrently depressurizing said first bed to lower pressure, withdrawing one part of the first bed gas from the cocurrent depressurization as product gas and returning another part for partial repressurization of another previously purged adsorbent bed, releasing waste gas from the cocurrently depressurized first bed inlet end thereby countercurrently depressurizing same to a lowest pressure, introducing one component-depleted gas from another adsorbent bed discharge end to the depressurized first bed discharge end as purge gas for desorption of the one component adsorbate and discharging the one component-containing purge gas from the first bed inlet end, and thereafter introducing one component-depleted gas from an other-than-first bed discharge end at above said lowest pressure to the purged first bed for partial repressurization thereof prior to introducing progressively higher pressure feed gas to the first bed inlet end. The product gas withdrawal rate from this apparatus periodically and uncontrollably varies on demand over multiple cycles from a maximum rate to reduced rate substantially below the maximum rate.

The inventive control apparatus for such reduced product gas withdrawal rate includes means for monitoring at least one product gas flow characteristic comprising withdrawal quantity and rate during at least a portion of the one component-depleted gas discharge from each adsorbent bed cycle. The control apparatus also includes means for advancing the cycle of each adsorbent bed from its cocurrent depressurization step to the immediately following step and simultaneously advancing the cycles of all other adsorbent beds. On occasion of a reduced gas product withdrawal rate as monitored by the aforementioned means the cycle advancing means is arranged so as to maintain the reduced product gas withdrawal quantity as a direct and predetermined function of the reduced rate of product gas withdrawal demand.

DESCRIPTION OF THE PREFERRED EMBODIMENTS

An on-site plant which supplied an over-the-fence or in-plant facility is often required to provide product at a variable rate. In the interest of economy, a consuming facility whose demand is not constant is best served by an on-site facility which can operate in a turn-down condition wherein product is produced at the demand rate and the process consumes power at a reduced rate. This invention which is directed to controlling pressure swing adsorption systems provides a method of and apparatus for maintaining product quality while operating such systems in a power saving, turn-down mode.

Figure 1:
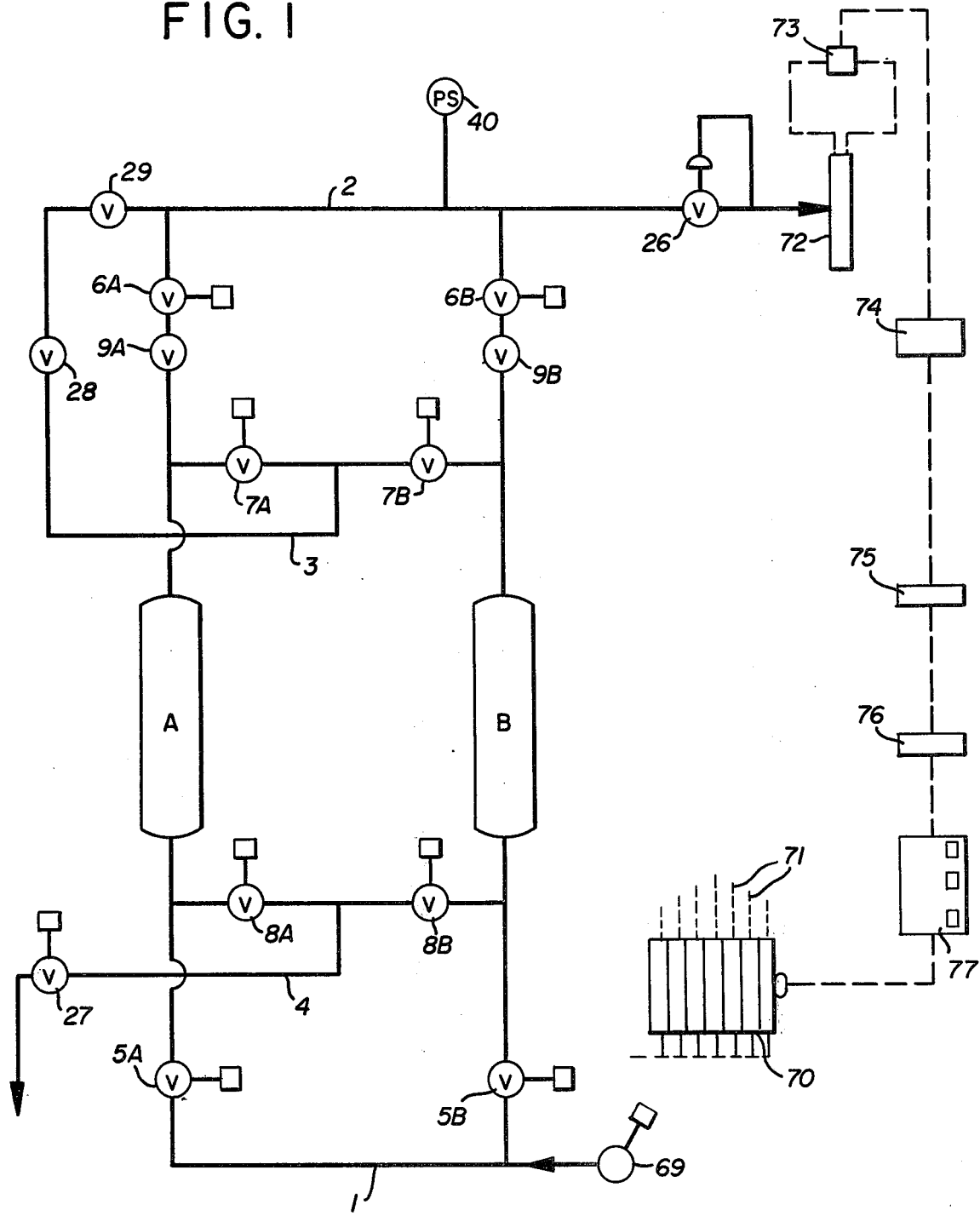
FIG. 1 is a schematic flowsheet of apparatus for practicing the time delay embodiment of the invention using two adsorbent beds piped in parallel flow sequence.
Figure 2:
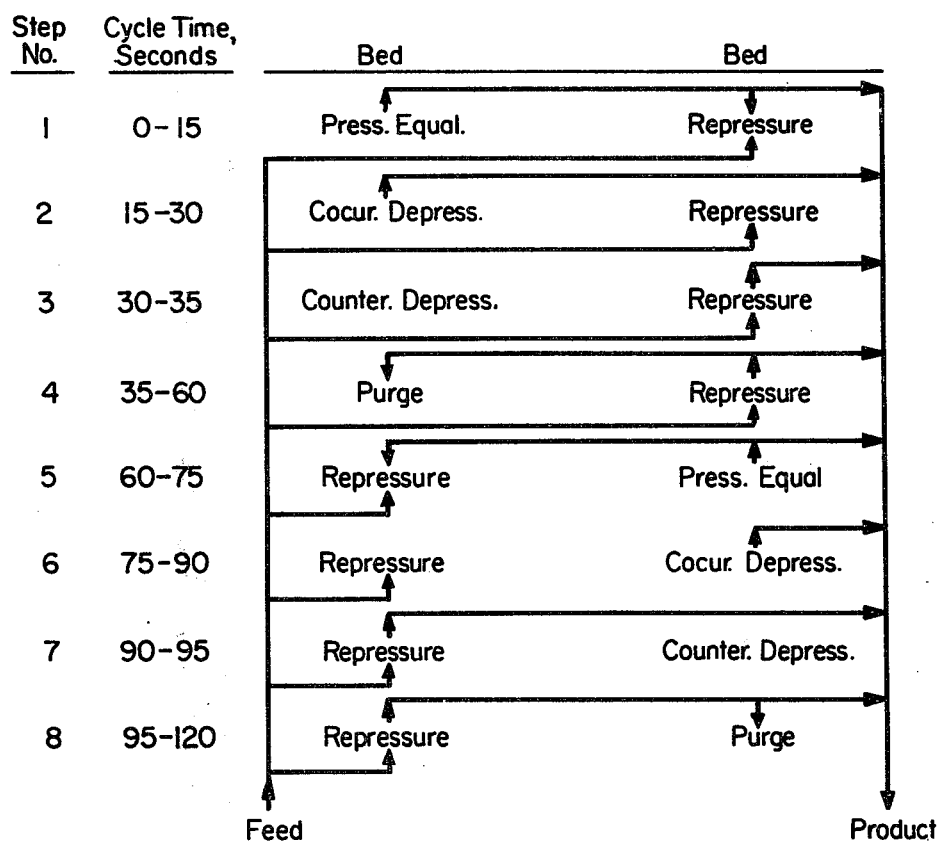
FIG. 2 is an eight step cycle and time program for a variable adsorption pressure system which can be practiced with the FIG. 1 apparatus.

FIG. 1 shows an embodiment of my invention in which two adsorbent beds A and B are connected in parallel flow relation and supplied compressed feed gas by reciprocating-type compressor 69. FIG. 2 enclosed illustrates a cycle sequence suitable for use with FIG. 1.

The beds are cycled through a sequence of events by the manipulation of switching valves. The actuation of the switching valves is performed by an appropriate means, i.e. the FIG. 1 programmable stepping switch 70. The output signals of the stepping switch, which are identified as item 71 in FIG. 1 are directed to the valve actuators. In the FIG. 1 embodiment the control method of our invention is implemented by the inclusion of an orifice 72 and differential pressure transmitter 73 in the product conduit 2. The output of the differential pressure transmitter is fed to square root integrator and pulse generator 74 thereby converting the signal to a pulse whose frequency is linearly proportional to product flow. The pulse is fed through time delay relay 75 and reset relay 76 to counter 77 which is programmed to advance the stepping switch 70 at the appropriate time as described below.

FIG. 2 illustrates one timing sequence suitable for use with the FIG. 1 system, employing eight distinct steps each involving commencement and/or termination of flows. Feed and product quality gas streams flowing into and out of the two bed system are indicated by vertical lines, i.e. flows in the feed manifold 1 and in the one component-depleted product quality gas manifold 2. The feed manifold 1 connects horizontally with each of the two adsorbent beds and the latter in turn join horizontally with the one component-depleted gas manifold 2. The repressurization and purge steps which use a portion of the one component-depleted gas are connected horizontally with the steps, e.g. pressure equalization and repressurization which supply the one component-depleted gas. The other portion of the one component-depleted gas in manifold 2 is withdrawn as product gas. Similarly the repressurization step is horizontally connected with the feed manifold which also supplies gas for this step. All inter-bed flows are identified on FIG. 2.

It will be apparent from FIG. 2 that at any moment of time one of the adsorbent beds is delivering gas at constantly varying pressure to the one component-depleted gas manifold 2 as follows: bed A during 0–30 seconds, bed B during 30–90 seconds, and bed A during 90–120 seconds. Accordingly, product flow to the consuming means is continuous. Each step in the cycle of bed B will now be outlined and related to those components of FIG. 1 which are involved in the cycle changes. Pressures illustrative of such operation for air separation using calcium zeolite A adsorbent are included.

Step 1 — Time 0–15 is a 15 second timed step. Bed B is being repressurized and bed A pressure equalized with valves 5B, 6A and 6B open and valves 7B and 8B closed. Flow continues until pressures between beds A and B are substantially equalized at about 19 psig, and during this period another part of the released gas from bed A is discharged as product and withdrawn through flow control valve 26 which valve is responsive to the product gas demand of the consuming facility (not shown).

Step 2 — Time is approximately 15–30 seconds but not timed. Valve 6B is now closed and only the flow of feed air continues to bed B for further repressurization. Feed air flow to bed B is discontinued when the pressure in bed B reaches 30 psig. During this same period bed A is being cocurrently depressurized by the flow of released gas from its discharge end through valves 6A and 9A to oxygen manifold 2 having pressure switch 40 therein. This step is terminated and the stepping switch 70 is advanced when the counter 77 has recorded that the programmed quantity of oxygen product gas has been delivered through orifice 72 by bed A. The programming of counter 77 and the significance of the programmed quantity of product gas is explained below.

Step 3 — Time 30–35 is a 5 second timed step. Valve 6A closes and in order for product flow to be uninterrupted, the product must be derived from bed B during the remainder of its repressurization step to the highest feed air pressure in feed conduit 1, e.g., 40 psig. Accordingly, valve 6B again opens and product gas flows therethrough to product quality gas manifold 2. Simultaneously, valve 8A opens and waste valve 27 opens for countercurrent depressurization of bed A to 0 psig. Counter 77 is reset and time delay relay 75 is actuated at the beginning of step 3. The counter 77 is actuated after the expiration of the programmed time period of delay relay 75.

Step 4 — Time 35–60 is a 25 second time step. Repressurization of bed B with compressed feed air continues until the 40 psig terminal pressure is reached. However, during this 25 second period only part of the gas emerging from the bed B discharge end is passed to the product-consuming means. Another part is directed to countercurrently depressurized bed A for countercurrent purging thereof, by opening valve 7A. Product quality gas then flows through conduit 3 and valves 28, 29 and 7A to the bed A discharge end for purging. During the bed A purge period, the feed air flow to bed B is substantially greater than the rate of product gas flow from its discharge end. The pressure of bed B rises progressively. The introduction of feed air to bed B is terminated by closing valve 5B when the pressure of bed B reaches 40 psig.

Step 5 — Time 60–75 is a 15 second timed step. The pressure equalization step for bed B and repressurization of bed A are commenced while the former continues to deliver product gas through valve 26. This is accomplished by opening valves 6A and 5A and closing valves 28, 7A, 8A and 27. Beds A and B are pressure-equalized at about 19 psig.

Step 6 — Time is approximately 75–90 seconds but the step is not timed. Bed B is cocurrently depressurized to about 6.5 psig with all the released gas being delivered as product gas and the repressurization of bed A continues but only by the introduction of feed air at the inlet end. This requires closing valve 6A. The step is terminated and the stepping switch 70 is advanced when the counter 77 has recorded that the programmed quantity of product oxygen gas been delivered by bed B through orifice 72.

Step 7 — Time 90–95 is a 5 second timed step. Bed B is countercurrently depressurized to about 1 atmosphere pressure by closing valves 6B and 9B, and opening valves 27 and 8B. Valve 6A is opened for one-component-depleted flow from the bed A discharge end to product manifold 2 and discharge as product gas. Counter 77 is reset and time delay relay 75 is actuated at the beginning of step 7. The counter 77 is actuated after the expiration of the aforementioned time delay relay 75 time period.

Step 8 — Time 95–120 is a 25 second timed step. Bed B is countercurrently purged with one component-depleted gas from bed A which is simultaneously being repressurized to the feed air terminal pressure of 40 psig. This is accomplished by opening valve 7B. At the end of this step, valves 7B and 8B are closed and bed B is again ready for repressurization in accordance with the foregoing sequence.

The timing of the sequential events as described above represents operation at maximum product flow rate. The control system of this invention functions in a turndown product withdrawal rate as will now be described.

Capital investment economy is best served by equipping the plant with a feed gas compressor whose full-load capacity approximates the feed gas capacity at maximum product flow rate.

In plants so equipped the above step 2 events of achieving a bed B pressure of 30 psig and satisfying the counter 77 requirement occur simultaneously. The stepping switch 70 is advanced and pressurization of bed A will begin without encountering an off-the-line compressor condition. However, during a turndown situation in which the product demand is less than maximum the pressurization of bed B to 30 psig is completed before bed A has delivered its programmed quantity of product gas and the compressor 69 can be taken off-the-line and returned with the commencement of step 3. Energy conservation can be practiced in installations which are equipped with reciprocating compressors by unloading the compressor during such off-the-line periods.

In the practice of this invention, the one component-depleted gas discharge period of bed A comprises steps 7, 8 1 and 2. Since the FIG. 1 apparatus is a time-delay embodiment, the total time period is divided into two parts. The first part is of fixed time duration set by time-delay relay 75 and the second part is a fixed product gas quantity recorded by counter 77. When the programmed quantity is reached, cocurrent depressurization step 2 is terminated and countercurrent depressurization step 3 is initiated. At the same point of time, bed B is advanced from its isolated condition at 30 psig, to begin its one component-depleted gas discharge period. The bed B one component-depleted gas discharge period comprises steps 3, 4, 5 and 6, and controlled in an anologous manner.

Figure 3:
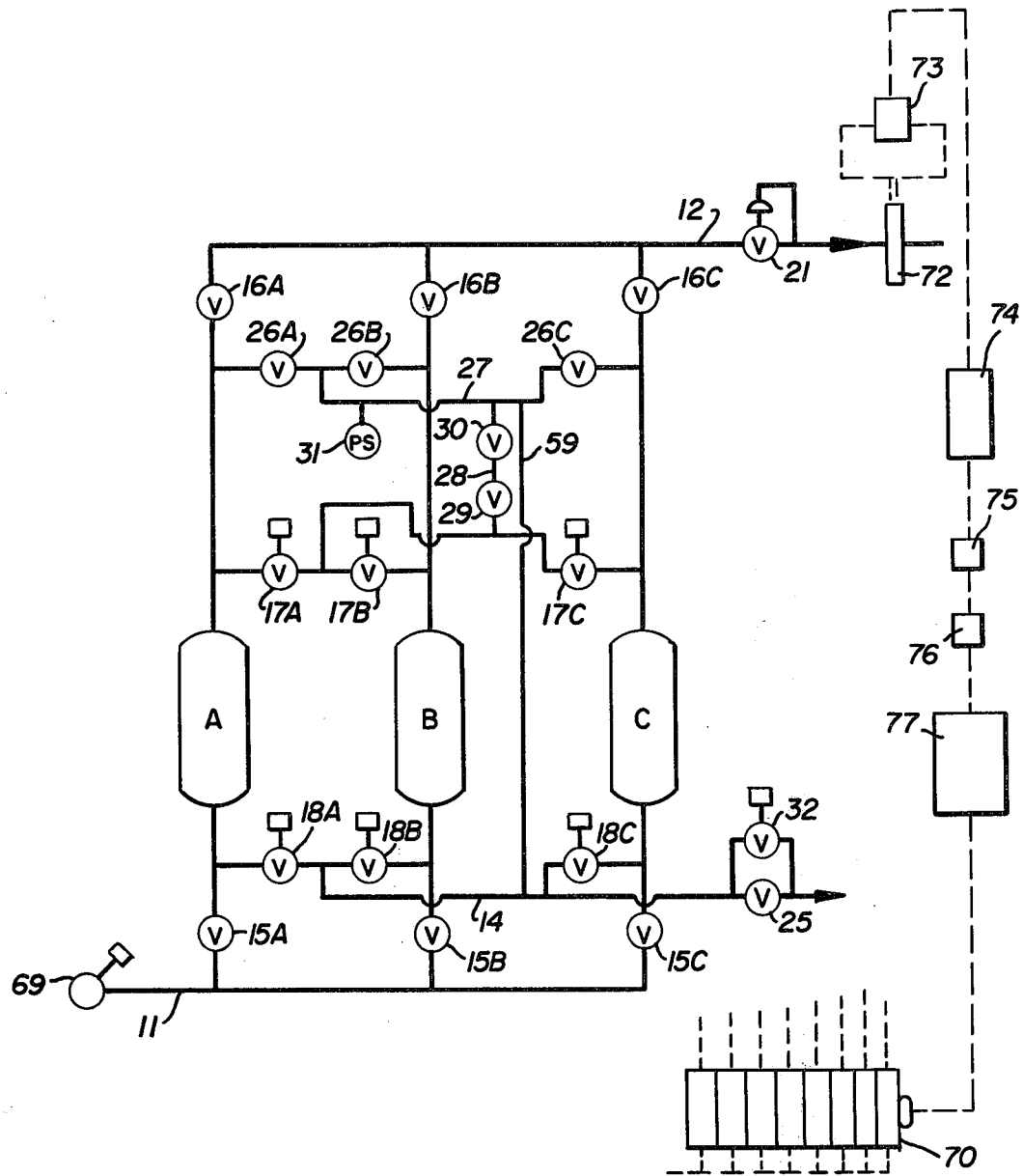
FIG. 3 is a schematic flow sheet of apparatus for practicing the time delay embodiment of the invention using three adsorbent beds piped in parallel flow sequence.

The FIG. 3 embodiment of this invention can be used to selectively adsorb one or more components from a gas mixture wherein the remaining components are not coadsorbed to an appreciable extent, as for example, a dissociated ammonia gas mixture comprising 75 percent hydrogen and 25 percent nitrogen using calcium zeolite A adsorbent which preferentially adsorbs nitrogen and hydrogen is only slightly adsorbed.

Figure 4:
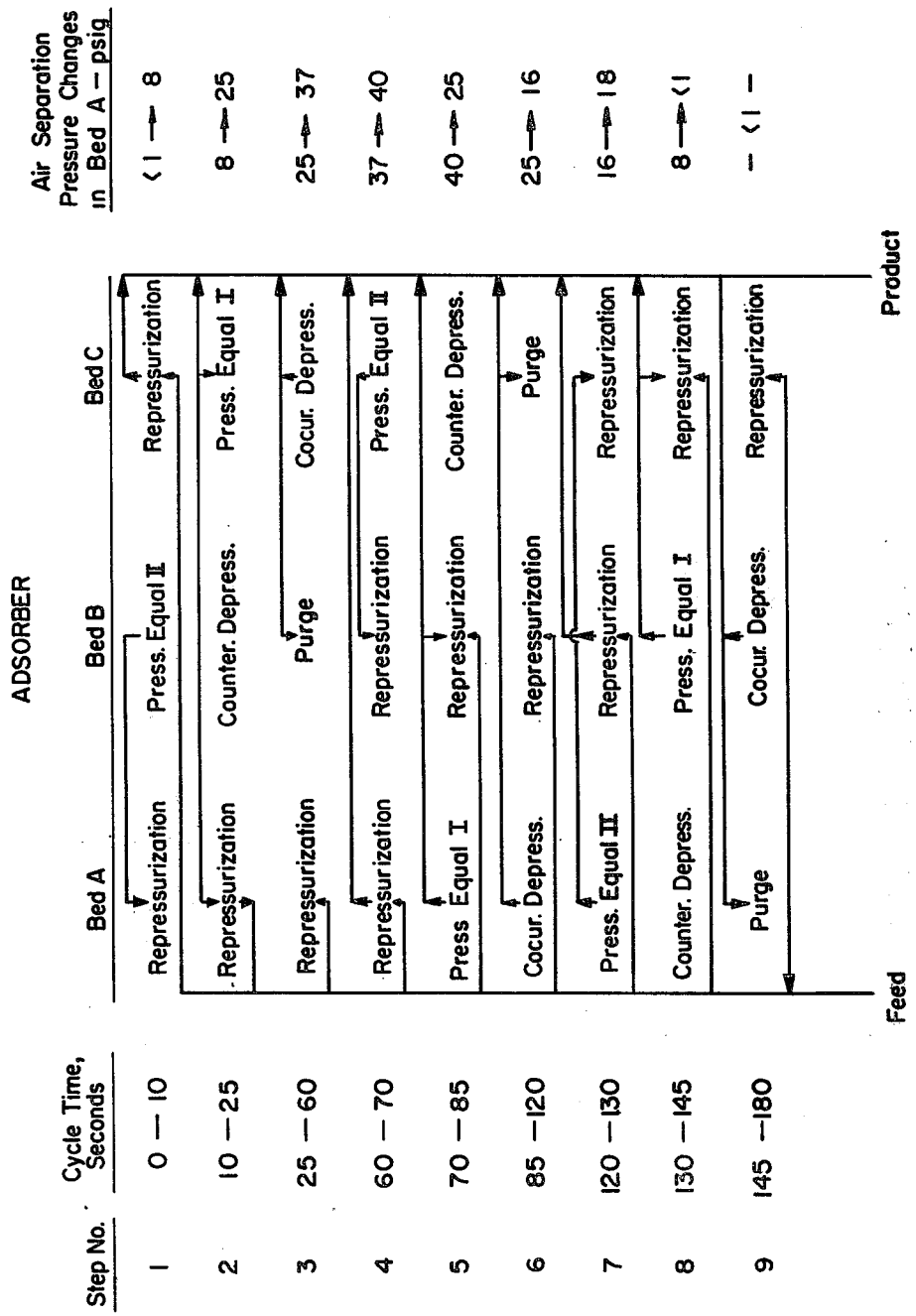
FIG. 4 is a nine step cycle and time program for a variable adsorption pressure system which can be practiced with the FIG. 3 apparatus.

In FIG. 3 the separation is performed with three beds wherein beds A, B and C are connected in parallel flow relation with conduits and valves numerically identified and the designation of the control instruments required to practice the invention is the same as that used for previously discussed FIG. 1. A portion of the product quality gas collected in manifold 12 is withdrawn as product gas through flow control valve 21, which is reponsive to the product gas demand of the consuming facility. FIG. 4 illustrates a cycle sequence suitable for use with FIG. 3 system employing nine distinct steps. Each step in the cycle of bed A will now be outlined and related to those components of FIG. 3 which are involved in the cycle changes.

Step 1 — Time 0–10 is a 10 second timed step. Bed A is being repressurized from the lowest process pressure to the lower equalization pressure (40 psig), bed B pressure equalized with bed A, and bed C proceeds through the second part of its increasing pressure adsorption step. Valves 26A and 26B in equalization manifold 27 with pressure switch 31 therein are open as are valves 15C and 16C. Feed gas compressed in reciprocating compressor 69 is introduced to bed C at its inlet end from manifold 11 and one component-depleted gas discharged therefrom through manifold 12 for delivery as hydrogen product gas. During this 10 second period the bed C pressure rises and the introduction of feed gas to bed C is discontinued by closing valve 15C when bed C pressure reaches 230 psig (highest pressure).

Step 2— Time 10–25 is a 15 second timed step. Valves 15A and 16A are open. One part of the nitrogen-depleted gas released from the bed C discharge end flows through manifold 12 and valve 16A into the bed A for further repressurization to the 140 psig higher equalization level. The remaining part of the released nitrogen-depleted gas from bed C is discharged as product gas. Valve 18B at the bed B inlet end and valve 32 are also opened and valve 25 is closed for simultaneous countercurrent depressurization of bed B from 40 psig to the lowest pressure of the process, and partial desorption of the nitrogen adsorbate, the latter being released through valve 32 in waste conduit 14. In the FIG. 3 embodiment the bypass around valve 25 is a relatively small conduit so that forcing the flow through the bypass introduces a restriction and limits the flow rate of gas during countercurrent depressurization.

Step 3 — Time is approximately 25–60 seconds and the product gas withdrawal quantity is monitored during at least the last portion of this step. Bed C is cocurrently depressurized by continued flow of nitrogen-depleted gas from its discharge end. Valves 17B, 25, 26C and 29 open and product quality gas flows through valve 26C in manifold 27 and conduit 28 to valve 17B for introduction to the bed B discharge end as purge gas. The latter emerges with the remaining nitrogen adsorbate at the bed B inlet end and flows through valve 18B, valve 25 and waste manifold 14 for venting. The purge of bed B is timed and discontinued by closing valves 17B, 18B, 29 and 25 after a purge period of 25 seconds has elapsed. The step is terminated and valve 16C is closed when counter 77 has recorded that the programmed quantity of product has been delivered from bed C, through valve 21.

Step 4 — Time 60–70 is a 10 second timed step. Valves 26B and 26C are open for pressure equalization of bed B and bed C at lower equalization pressure of 40 psig. Valve 16A is opened and bed A begins its delivery of product quality gas to manifold 12. Repressurization of bed A is discontinued by closing valve 15A when the bed A pressure reaches 230 psig. Time delay relay 75 is actuated at the beginning of Step 4. Counter 77 is actuated when the programmed time period in relay 75 has elapsed thereby beginning a delayed count of the quantity of product delivered through valve 21 by bed A.

Step 5 — Time 70–85 is a 15 second timed step. Valves 15B and 16B open for flow of nitrogen-depleted gas from the bed A discharge end to the bed B discharge end. Feed gas is also introduced to the bed B inlet end through valve 15B and the beds are equalized at the higher equalization of 140 psig. Values 25, 26B and 26C close and valves 18C and 32 open for simultaneous countercurrent depressurization of bed C from 40 psig to the lowest pressure of the process.

Step 6 — Time is approximately 85–120 seconds and the product gas withdrawal quantity from bed A is monitored during at least the last portion of this step. Valves 25, 26A, 29 and 17C open for flow of bed A cocurrent depressurization gas through conduits 27 and 28 (containing back pressure regulator 30) to the bed C discharge end and countercurrent purging thereof at the lowest pressure. This purging is terminated, after an elasped time of 25 seconds, by closing valves 17C, 18C, 29 and 25. During this period valve 15B remains open for the bed B increasing pressure step. The step is terminated and valve 16A is closed when counter 77 has recorded that the programmed quantity of product has been delivered from bed A through valve 21.

Step 7 — Time 120–130 is a 10 second timed step. Valve 16B is opened and bed B begins its delivery of product quality gas to manifold 12. Feed gas repressurization of bed B is discontinued by closing valve 15B when bed B pressure reaches 230 psig. Time delay relay 75 is actuated and counter 77 is actuated when the time delay relay 75 programmed time period, has elapsed, thereby beginning a delayed count of the quantity of product gas delivered through valve 21 by bed B. Valve 26C opens for pressure equalization of beds A and C at the lower equalization level of 40 psig.

An alternative arrangement for conducting the second pressure equalization step can be practiced which obtains still higher recovery of one-component depleted gas. According to the alternative arrangement, the gas withdrawn from the bed undergoing depressurization is introduced to the inlet end of the bed being repressurized. This permits the one component mass transfer front to be advanced all the way to the discharge end of the bed being depressurized. The loss of purity in the equalization gas which occurs upon breakthrough of the selectively adsorbed one component is not detrimental to the cleanliness of the bed being repressurized becuase the gas does not contact the discharge end of such bed.

Fig. 3 includes provision for flowing the second equalization gas from the discharge end to the inlet end of the two beds. Thus, in the 120–130 second period of the cycle of FIG. 3, valve 18C may be opened rather than valve 26C. Equalization gas may now flow from bed A through 26A, 27, 59 and 18C into bed C inlet end. Since waste manifold 14 is used for conducting this flow, valves 25 and 32 must both be closed while equalization is in progress and until valves 18C and 26A are again closed. When the second equalization step of bed A is complete, the system is prepared for the next 130–145 second step by closing valves 18C, 26A and 15B and opening valves 18A, 32, 15C and 16C.

Step 8 — Time 130 - 145 is a 15 second timed step. Valves 25, 26A and 126C close and valves 18A and 32 open releasing gas from the bed A inlet end for countercurrent depressurization to the lowest pressure of less than 1 psig. This gas flows through waste manifold 14 and flow restricting valve 32 for venting. Simultaneously valves 15C and 16C open for feed gas flow to the bed C inlet and flow of nitrogen-depleted gas from bed B to the bed C discharge end for equalization at the higher equalization level of 140 psig.

Step 9 — Time is approximately 145–180 seconds and the product gas withdrawal quantity from bed B is monitored during at least the last portion of this step. Valves 26B, 17A, 29 and 25 open allowing nitrogen-depleted gas to flow from the bed B discharge end through back pressure regulator 30 as purge gas for bed A. This flow continues until terminated, after an elasped purge time of 25 seconds, by closing valves 17A, 18A, 29 and 25. Simultaneously, feed gas flow continues through valve 15C for the repressurization of bed C. The step is terminated and valve 16B is closed when counter 77 has recorded that the programmed quantity of product has been delivered from bed B through valve 21.

Summarizing the FIG. 3 and 4 embodiment, the one component-depleted gas discharge period of bed A comprises steps, 4, 5 and 6. Since the FIG. 3 apparatus is a time delay embodiment the total time period is divided into two parts. The first part is of fixed time duration set by time delay relay 75 and the second part is a fixed product gas quantity recorded by counter 77. When the programmed quantity is reached, cocurrent depressurization step 6 is terminated and the second pressure equalization step is initiated. At the same point of time, bed B is advanced from its isolated condition at 140 psig to begin its product delivery and further repressurization to 230 psig. Also bed C is advanced from its isolated condition after purging to begin repressurization by pressure equalization with bed A. The bed B one component-depleted gas discharge period comprises steps 7, 8 and 9, and the bed C one component-depleted gas discharge period comprises steps 1, 2 and 3. Each is controlled in a manner analogous to bed A.

Asuming that the fluid flow conduits are of adequate size the product capacity of a pressure swing adsorption system is related to the adsorbent inventory of the system. The capacity of an adsorbent bed to deliver one component-depleted gas is limited since continued discharge of gas will cause the emergence of the mass transfer front and contamination of the product.

In a plant which is equipped with the control system of this invention, Q, the quantity of product discharged per bed cycle is a direct function of R, the product withdrawal rate. By example, with the FIG. 1 embodiment, the cycle is advanced when the time delayed counter 77 has recorded a programmed count. During periods of maximum demand in which product is withdrawn at the rate $R_M$ units per unit time, the quantity of product withdrawn prior to the actuation of counter 77 is $R_M T$ where T is the time delay relay 75 programmed setting. The total quantity $Q_M$ withdrawn per cycle is the sum of $Q_F$ and $R_M T$ where $Q_F$ is fixed and is the programmed quantity of product gas associated with the above cited programmed count. In practice, counter 77 is programmed such that at maximum product withdrawal rate the plant delivers the maximum quantity of product gas per cycle. However, during turndown, with product demand reduced to $R_T$ unit. per unit time (less than $R_M$) the quantity of product discharged per bed cycle is $$Q_T = Q_F + R_T T \tag{1}$$

Since the quantity of feed gas introduced to the system per cycle is not materially altered during turndown, the recovery of product gas expressed as a fraction of maximum recovery is $$Q_T/Q_M = (Q_F/Q_M) + (R_T T/Q_M) \tag{2}$$

Now if the notation $\mu_1$ = fractional reduction of product withdrawal rate from an initial rate $R_M$ to the reduced rate $R_T$, $\mu_2$ = fractional reduction of quantity of product withdrawn per bed cycle from an initial quantity $Q_M$ to a reduced quantity $Q_T$, then $$\mu_2 = (1 - Q_F/Q_M)\mu_1 \tag{3}$$

The later equation shows that the fractional reduction of product withdrawn per bed per cycle is less than the fractional reduction of the product withdrawal rate, i.e., $\mu_2 < \mu_1$. In a system operating on a purely timed cycle in which product is withdrawn for a programmed time period regardless of withdrawal rate, the quantity of product withdrawn per bed cycle is reduced in the same proportion as the product withdrawal rate is reduced, i.e. $\mu_2 = \mu_1$. Since the feed gas to the system per cycle is essentially constant and independent of product withdrawal rate, such reduction of product withdrawn per bed cycle represents a significant reduction of the percent recovery.

The FIG. 3 embodiment as employed for air separation may be used by the practioneer to incorporate the time-delay embodiments of the invention in a plant, and also to demonstrate the $Q_T/Q_M - R_T/R_M$ relationship. Cycle sequence and pressures illustrative of such operation using calcium zeolite A adsorbent are shown in FIG. 4. A FIG. 3 air separation plant which practices the FIG. 4 cycle and at maximum production rate is capable of producing 5 tons $O_2$/day at 90% $O_2$ purity was used for this demonstration.

Step A — The plant was operated at maximum 90% $O_2$ production rate of 5 tons $O_2$/day on a timed 180 second cycle in which each of the beds had a product withdrawal time $T_T$ of 60 seconds per cycle and the cycle was advanced according to elapsed time. The counter 77 was manually reset and actuated at the beginning of the FIG. 4 steps 1, 4 and 7 when each of the three beds began product gas withdrawal to determine the count which is associated with the quantity of product withdrawn per bed cycle at maximum production rate.

Step B — The time delay relay 75 was programmed to delay the actution of the counter 77. The stepping switch 70 was programmed to terminate FIG. 4 steps 3, 6 and 9 (the cocurrent depressurization step) on command of the counter. Counter 77 was installed to advance stepping switch 70 after registration of the programmed count. As used herein the "programmed count" is the product of the count determined at maximum production rate (step A above) and the fraction $(T_T - T)/T_T$.

Figure 5:
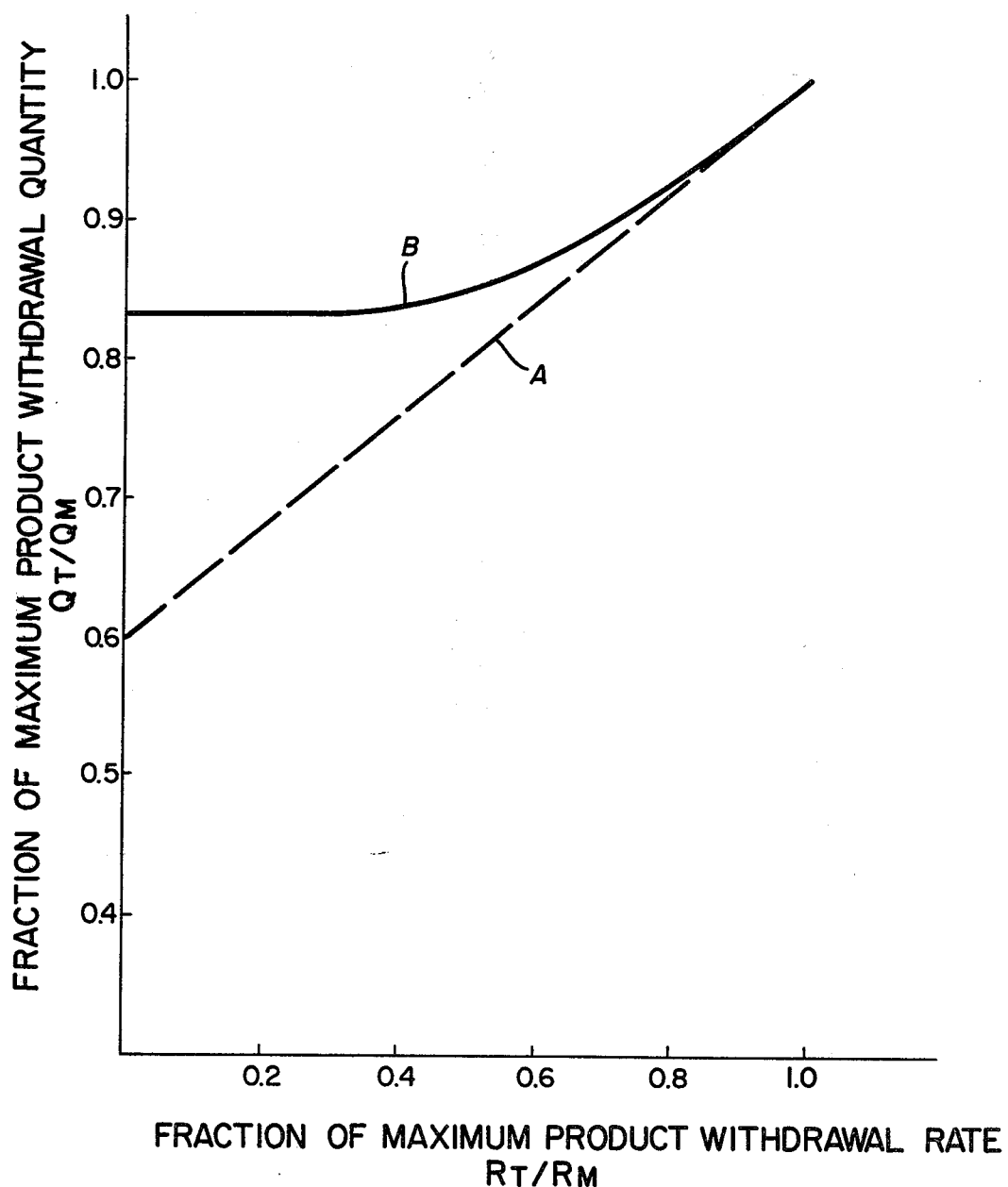
FIG. 5 is a graph showing the relationship between fraction of maximum product withdrawal quantity $Q_T/Q_M$ and fraction of maximum product withdrawal rate $R_T/R_M$ while practicing two embodiments of the turndown control system of this invention.

Step C - With the turndown product withdrawal rate arbitrarily adjusted to 50% of maximum, the product purity and quantity of air feed was monitored and the relationship between product purity and the time delay T was established. A time delay T of about 24 seconds was required to maintain a product purity of 90% $O_2$ at 50% turndown. With a time delay less than 24 seconds the purity declined below 90% $O_2$ so that quantity of one-component depleted gas discharged from the bed was too high. If the time delay exceeds 24 seconds the product purity rises about 90% and recovery declines. With time delay relay 75 programmed for a 24 second delay (T), values of $Q_T/Q_M$ were obtained for turndown operation over the range of $R_T/R_M$ from 0.2 – 1.0. FIG. 5 (plot A) shows that for the time delay embodiment the product gas withdrawal rate and quantity withdrawal relationship during turndown is linear and that $\mu_2$ equals 0.4 of $\mu_1$. With a time delay period T of 24 seconds the system is programmed to practice the FIG. 5 plot A relationship.

By way of further illustration, if during preceding step A the counter 77 registered 90 counts representing the maximum product withdrawal quantity per bed per cycle, in step B with a time delay period T of 24 seconds the counter was programmed for a count of 36/60 (90)=54. In step C with 50% turndown the product quantity withdrawn during time delay period T was the equivalent of 0.5 (24) (90)/60=18 counts. During the period in which the counter 77 was actuated the quantity of product withdrawn was equivalent to 54 counts. Therefore the total quantity of product withdrawn per bed per cycle at 50% turndown was the equivalent of 72 counts or 80% of the quantity of 90 counts withdrawn at the maximum product withdrawal rate.

Plot B of FIG. 5 shows test results for a 6 tons $O_2$/day maximum production rate plant in which the product purity was continuously monitored and the product gas withdrawn per bed per cycle was manually adjusted to the quantity with which a 90% $O_2$ product was produced. The $R_T/R_M$ ratio was varied through the range 0.3 –1.0. The linear relationship of plot A is a natural consequence of the manner in which the FIGS. 1 and 3 embodiments of the invention control the quantity of product withdrawn per bed per cycle. However, plot B shows that specified average product purity can be achieved by maintaining a $Q_T/Q_M$ and $R_T/R_M$ relationship which is non-linear and relative to the plot A relationship allows the withdrawal of a greater quantity of product in the lower $R_T/R_M$ range.

Figure 6:
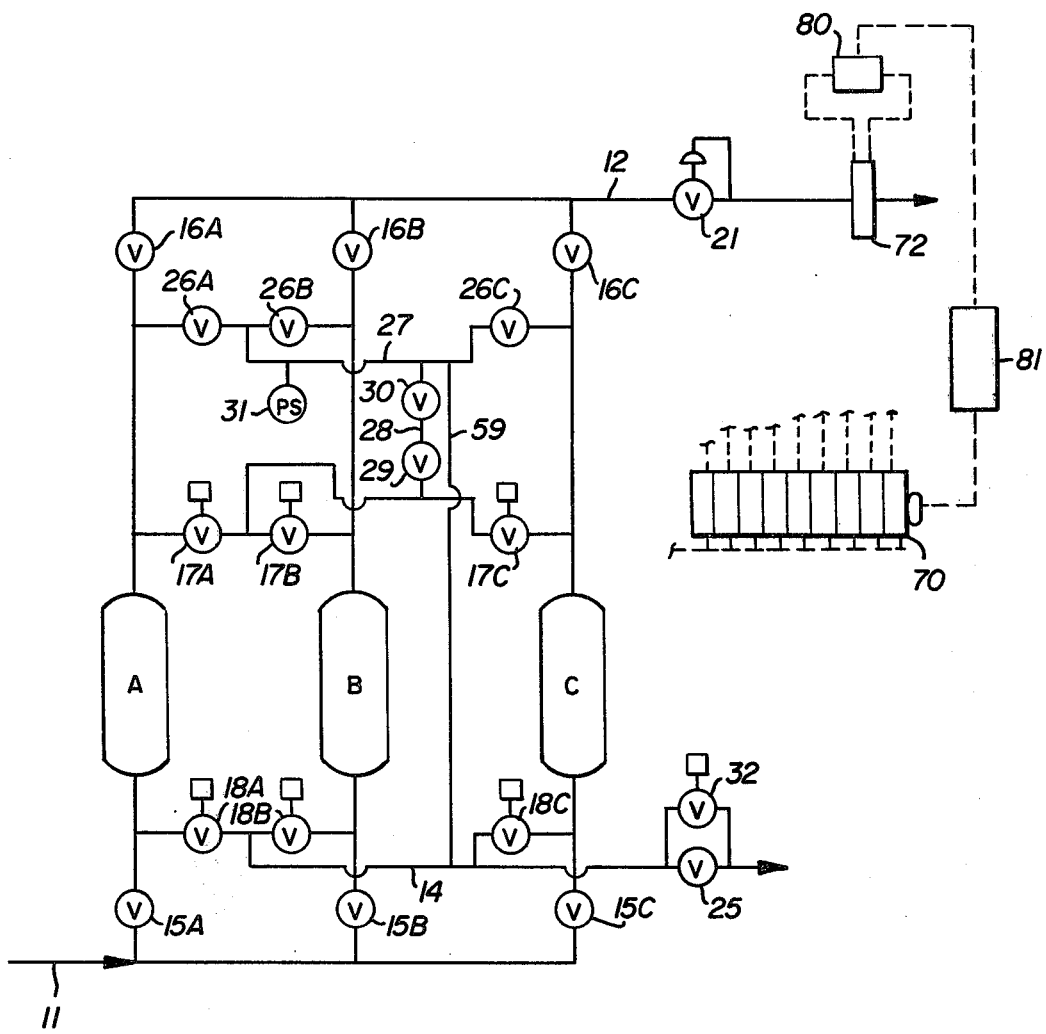
FIG. 6 is a schematic flowsheet of apparatus for practicing the product gas flow rate monitoring-analog computer totalizing embodiment of the invention using three adsorbent beds piped in parallel flow sequence.

FIG. 6 is an embodiment of the invention which can practice the FIG. 5, plot B relationship. Differential pressure $(d/p)$ transmitter 80 is arranged to sense the pressure differential across flow orifice 72 positioned in the product withdrawal conduit 12. The signal from the $d/p$ transmitter 80 is sent to analog computer 81 which is programmed and installed to advance stepping switch 70. The FIG. 6 system may for example practice the FIG. 4 cycle for the separation of air. As previously described above the steps 1, 2, 4, 5, 7 and 8 of FIG. 4 are timed steps. The computer 81 is reset at the beginning of steps 1, 4 and 7 and is programmed to react to the strength of the signal which it receives from $d/p$ transmitter 80, which signal is a direct function of $R_T/R_M$. Cocurrent depressurization steps 3, 6 and 9 are terminated on the command of the analog computer 81 thereby providing a means of controlling $Q_T$, the quantity of product extracted per bed per cycle. The following equations fit the experimental data of plot B:

For $R_T/R_M$ in the range of 0.4–1.0, $$Q_T/Q_M = [R_T/R_M(\log_{10} R_T/R_M + 0.1) + 1.1]/1.2 \quad (4)$$

$$R_T/R_M \text{ less than } 0.4, \; Q_T/Q_M = 0.83 \quad (5)$$

Although not fully understood, the following is a partial explanation of the adsorption dynamics which create the prior art problem of reduced product recovery on turndown, and the improvement of this invention.

As previously cited, Treybal shows that MTZ, the length of an adsorption mass transfer front is a direct function of G, the mass flow rate of the gas through the adsorbent bed. However, Treybal also shows that MTZ is an inverse function of Ky, the overall mass transfer coefficient and that MTZ is proportional to G/Ky. Since Ky is also a direct function of G the inclusion of its effect on MTZ is required to predict the full effect of a change in gas flow rate. Efficiency is best served by processes which compensate for changes in the length of the mass transfer front and advance the front as far as possible towards the discharge end during the one component-depleted gas discharge period, thereby insuring the withdrawal and recovery of the maximum quantity of specified average product purity gas which can be extracted from the bed.

Figure 7:
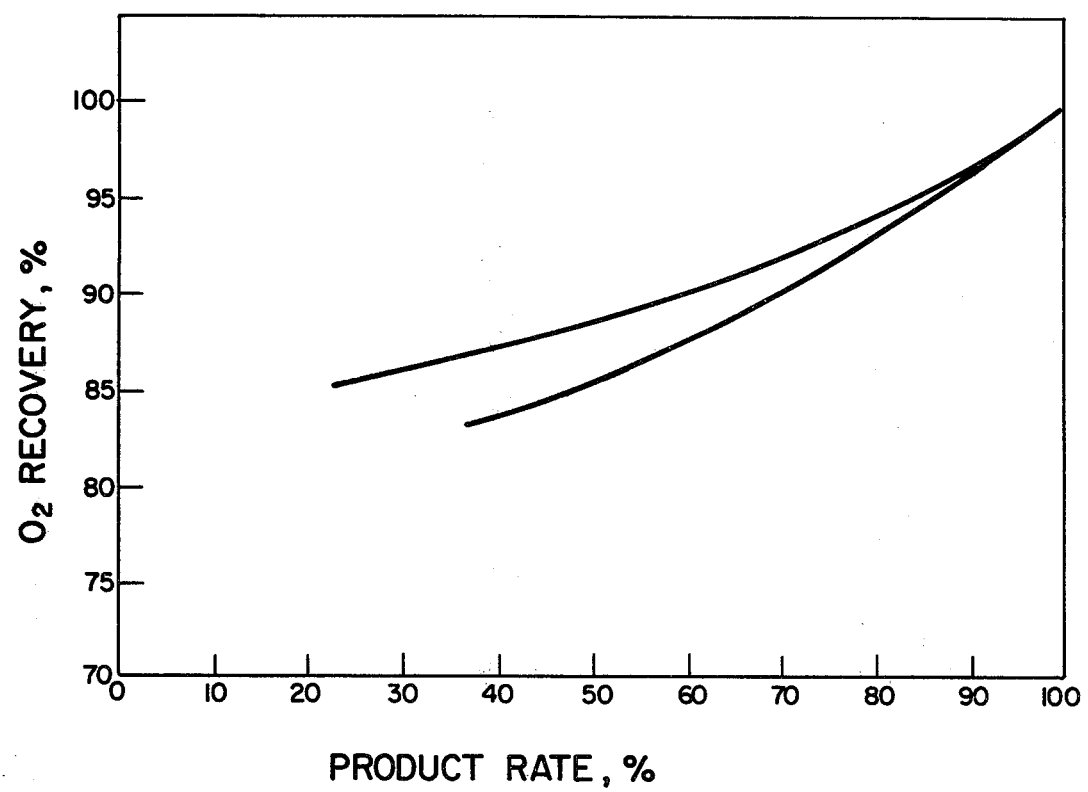
FIG. 7 is a graph showing product gas recovery percent as a function of reduced product gas flow rate (turndown) for the prior art pressure control system and the time delay embodiment of this invention, in a three bed air separation system of the FIG. 3–4 type for 90% oxygen production.

The control philosophy of the prior art, wherein the one component-depleted gas delivering cocurrent depressurization step is terminated by a pressure switch, assumed that the quantity of gas contained in the bed was proportional to the bed pressure, thereby insuring that the quantity of gas extracted and the advancement of the mass transfer front was constant from cycle to cycle. The assumption is well founded since it is known that adsorption isotherms typically show a relationship in which the quantity of adsorbed gaseous species increases with pressure and moreover very rarely exhibit a measurable degree of hysteresis. I have discovered that the quantity of desorbate collected from a prior art pressure switch controlled variable adsorption pressure process is also affected by desorption rate and furthermore that the quantity decreases as the rate of desorption decreases. The lower curve of FIG. 7 shows that the recovery decreases with decreasing product withdrawal rate. Apparently the low intra-bed gas flow rates associated with low product withdrawal rate have significantly affected the mass transfer zone and adversely affected the distribution of gases in the bed. It will be apparent that the quantity of oxygen contained in the bed at the termination of cocurrent depressurization and subsequently rejected during countercurrent depressurization and purge is increased with decreasing product gas withdrawal rate. A concomitant increase of product purity is also encountered at low product withdrawal rates by processes practicing the prior art control method, suggesting that such processes do not insure maximum possible advancement of the mass transfer front from cycle to cycle irrespective of the product withdrawal rate.

I have discovered that the cocurrent depressurization step may be advantageously continued beyond the bed pressure condition at which the prior art control process terminates discharge of one component depleted gas. This control system is product gas quantity-related and provides advancement of the mass transfer zone as far as possible towards the discharge end, thereby maximizing the recovery of product gas.

FIG. 7 is a graph showing a qualitative comparison of the FIG. 3 and 4 embodiment of this invention and the previously described pressure switch-controlled turndown system described in Batta U.S. Pat. No. 3,636,679. The data forming the basis for this comparison was obtained in a commercial sized three bed system used to separate air and yield 90% $O_2$ product gas. By way of illustration the graph shows that at 50% turndown, the recovery using the Batta control system is about 85% (lower curve) whereas a recovery of about 88% (upper curve) oxygen is achieved with the invention. As illustrated in FIG. 5, an even greater improvement should be realized with the analog computer embodiment of FIG. 6.

Although preferred embodiments of the invention have been described in detail, it is contemplated that modifications of the method and apparatus may be made and that some features may be employed without others, all within the spirit and scope of the invention.

What is claimed is:

1. In a adiabatic pressure swing process for gas separation by selectively adsorbing at least one gas component in at least two adsorbent beds and withdrawing one component-depleted product gas therefrom at specified average purity and variable pressure in a repetitive cycle by introducing feed gas at progressively higher pressure to the inlet end of a first adsorbent bed thereby progressively increasing the pressure therein to a highest pressure and discharging one component-depleted product gas also at progressively increasing pressure from the discharge end with a one component mass transfer front being initially established at the inlet end and moving toward the discharge end during cycle steps including cocurrently depressurizing said first bed and terminating such cocurrent depressurization when the first bed is at lower pressure, withdrawing one part of the first bed gas from the cocurrent depressurization as product gas at progressively decreasing pressure and returning another part for partial repressurization of another previously purged adsorbent bed, releasing waste gas from the cocurrently depressurized first bed inlet end thereby countercurrently depressurizing same to a lowest pressure, introducing one component-depleted gas from another adsorbent bed discharge end to the depressurized first bed discharge end as purge gas for desorption of the one component adsorbate and discharging the one component-containing purge gas from the first bed inlet end, and thereafter introducing one component-depleted gas from an other-than-first bed discharge end at above said lowest pressure to the purged first bed for partial repressurization thereof prior to reintroducing progressively higher pressure feed gas to the first bed inlet end, and wherein the product gas withdrawal rate periodically and uncontrollably varies on demand over multiple cycles from a maximum rate to reduced rate substantially below said maximum rate, the improvement comprising:

(a) monitoring at least one product gas flow characteristic comprising withdrawal quantity and rate during at least a portion of the one component-depleted gas discharge period from each adsorbent bed cycle, (b) on occasion of said reduced rate of product gas withdrawal demand, advancing the cycle of each adsorbent bed from its cocurrent depressurization step to the immediately following step and simultaneously advancing the cycles of all other adsorbent beds so as to maintain the product gas withdrawal quantity as a direct and predetermined function of said reduced rate of product gas withdrawal demand, with the cocurrent depressurization step advancing such that the fractional reduction in product gas discharge quantity per adsorbent bed per cycle is greater than 5% of the fractional reduction in product gas withdrawal rate from said maximum rate and the terminal pressure of said cocurrent depressurization step is below the corresponding terminal pressure at the product gas maximum withdrawal rate, and the movement of the one component mass transfer front is limited such that the one component-depleted product gas discharged from the absorbent bed last receiving repressurization gas from the first absorbent bed during its cocurrent depressurization step delivers product gas of at least said specified average product purity.

2. A process according to claim 1 wherein product gas withdrawal quantity is the monitored product gas flow characteristic, the one component-depleted gas discharge period of each adsorbent bed is divided into a first part of fixed time duration and a second part yielding a fixed quantity of product gas, and the cycle is advanced from the cocurrent depressurization step on completion of said second part.

3. A process according to claim 1 wherein product gas withdrawal rate is the monitored product gas flow characteristic, the product gas withdrawal quantity is totalized during the one component-depleted gas discharge period of each adsorbent bed, and the cycle is advanced from the cocurrent depressurization step when the product gas withdrawal quantity reaches a predetermined total.

4. In adiabatic pressure swing apparatus for gas separation by selective adsorption of at least one component in at least two adsorbent beds arranged and joined for alternate flow of feed gas mixture to the inlet end of each adsorbent bed and withdrawal of one component-depleted product gas in a repetitive cycle with cycle control means for introducing feed gas mixture at progressively higher pressure to the inlet end of a first absorbent bed thereby progressively increasing the bed pressure and discharging one component-depleted gas also at progressively increasing pressure from the discharge end, reducing the pressure at the first bed discharge end thereby cocurrently depressurizing said first bed to lower pressure, withdrawing one part of the first bed gas from the cocurrent depressurization as product gas at progressively decreasing pressure and returning another part for partial repressurization of another previously purged adsorbent bed, releasing waste gas from the cocurrently depressurized first bed inlet end thereby countercurrently depressurizing the first bed to a lowest pressure, introducing one component-depleted gas from another adsorbent bed discharge end to the depressurized first bed discharge end as purge gas for desorption of the one component adsorbate and discharging the one component-containing purge gas from the first bed inlet end, and thereafter introducing one component-depleted gas from an other-than-first bed discharge end at above said lowest pressure to the purged first bed for partial repressurization thereof prior to introducing progressively higher pressure feed to the first bed inlet end, and wherein the product gas withdrawal rate periodically and uncontrollably varies on demand from a maximum rate to reduced rate substantially below said maximum rate, improved control apparatus for such reduced product withdrawal rate comprising:

(a) means for monitoring a product gas flow characteristic during at least a portion of the one component-depleted gas discharge from each adsorbent bed cycle;

(b) means for advancing the cycle of each adsorbent bed from its cocurrent depressurization step to the immediately following step and simultaneously advancing the cycles of all other adsorbent beds on occasion of a reduced gas product withdrawal rate as monitored by means (a), being arranged and constructed so as to maintain the reduced product gas withdrawal quantity as a direct and predetermined function of the reduced product gas withdrawal quantity.

5. Apparatus according to claim 4 wherein the product gas flow characteristic monitoring means and cycle advancing means comprises a flow orifice in the product gas withdrawal conduit, means for sensing the pressure differential across the orifice, means for transmitting the sensed pressure differential and converting the transmitted pressure differential to a pulse having frequency linearly proportional to product flow rates, a time delay relay for receiving said pulse, a counter joined to said time delay relay, and a stepping switch joined to said counter and programmed thereby to be advanced in response to said pulse and joined to said flow control valves for said advancing of the cycle.

6. Apparatus according to claim 4 wherein the product gas flow characteristic monitoring means and cycle advancing means comprises a flow orifice in the product gas withdrawal conduit, means for sensing the pressure differential across the orifice, an analog computer constructed and programmed to totalize the product withdrawal quantity from the pressure differential sensing, and a stepping switch joined to said analog computer and programmed thereby to be advanced in response to the product withdrawal quantity when the latter reaches a predetermined total, being joined to said flow control valves for said advancing of the cycle.

* * * * *